United States Patent
Baker et al.

(10) Patent No.: US 9,815,014 B2
(45) Date of Patent: Nov. 14, 2017

(54) REVERSING BLOWER ADSORPTION UTILIZING COASTING

(71) Applicant: Pacific Consolidated Industries, LLC, Riverside, CA (US)

(72) Inventors: Mark Baker, Lake Elsinore, CA (US); Jason Burns, Irvine, CA (US); William K. Goshay, Porter Ranch, CA (US); Tarik Naheiri, Dana Point, CA (US)

(73) Assignee: Pacific Consolidated Industries, LLC, Riverside, CA (US)

( * ) Notice: Subject to any disclaimer, the term of this patent is extended or adjusted under 35 U.S.C. 154(b) by 0 days.

(21) Appl. No.: 14/973,980

(22) Filed: Dec. 18, 2015

(65) Prior Publication Data

US 2016/0184764 A1    Jun. 30, 2016

Related U.S. Application Data

(60) Provisional application No. 62/098,052, filed on Dec. 30, 2014.

(51) Int. Cl.
  B01D 53/047    (2006.01)
  B01D 53/053    (2006.01)
  (Continued)

(52) U.S. Cl.
  CPC .......... B01D 53/002 (2013.01); B01D 53/02 (2013.01); B01D 53/0476 (2013.01); B01D 53/22 (2013.01); B01D 53/229 (2013.01); B01D 63/02 (2013.01); B01D 53/053 (2013.01); B01D 2256/12 (2013.01); B01D 2257/102 (2013.01); B01D 2257/11 (2013.01);
  (Continued)

(58) Field of Classification Search
  CPC ...... B01D 53/002; B01D 53/02; B01D 53/04; B01D 53/0476; B01D 53/053; B01D 53/22; B01D 53/229; B01D 63/02; B01D 2256/12; B01D 2257/11; B01D 2257/40; B01D 2257/80; B01D 2259/40007; B01D 2259/40009; B01D 2259/401; B01D 2259/402
  USPC ........ 95/95–98, 102, 103, 130; 96/115, 116, 96/143
  See application file for complete search history.

(56) References Cited

U.S. PATENT DOCUMENTS 4,968,329 A    11/1990  Keefer
5,656,067 A    8/1997   Watson
(Continued)

*Primary Examiner* — Frank Lawrence
(74) *Attorney, Agent, or Firm* — Heisler & Associate

(57) ABSTRACT

A driving system for a reversing blower adsorption based air separation unit is configured to not only drive the reversing blower cyclically in a forward and in a reverse direction, but also to allow the reversing blower to coast during a portion of its operating cycle. While coasting, a pressure differential across the blower acts alone to switch the reversing blower between a forward and a reverse direction of operation. Less power is thus required. When coasting, the blower can also be configured to output power such as the drive motor functioning as an electric generator or by having a mechanical power input be driven by the blower for power generation and/or energy storage. Such a system beneficially utilizes the energy associated with the pressure differential across the blower for energy harvesting and to further accelerate cycle times for the reversing blower adsorption based air separation unit.

14 Claims, 8 Drawing Sheets

(51) Int. Cl.
*B01D 53/00* (2006.01)
*B01D 53/02* (2006.01)
*B01D 53/22* (2006.01)
*B01D 63/02* (2006.01)

(52) U.S. Cl.
CPC ...... *B01D 2257/40* (2013.01); *B01D 2257/80* (2013.01); *B01D 2259/401* (2013.01); *B01D 2259/402* (2013.01); *B01D 2259/40007* (2013.01); *B01D 2259/40009* (2013.01)

(56) References Cited

U.S. PATENT DOCUMENTS

| | | |
|---|---|---|
| 8,496,738 B1 | 7/2013 | Naheiri |
| 2007/0289446 A1 | 12/2007 | Occhialini |
| 2011/0315009 A1* | 12/2011 | Ambriano .......... B01D 53/0476 95/26 |
| 2013/0323014 A1 | 12/2013 | Rosinski |

* cited by examiner

Typical S-VSA Cycle Steps

| VSA Stage | Duration of Stage | Blower Mode | |
|---|---|---|---|
| Feed Step | 12 | Powered Rotation Forward | |
| Coast EOF | 2 | Non-Powered Rotation Forward | Optional Regenerative Braking |
| Reverse Blower | 3 | Non-Powered Rotation Reverse | |
| Vacuum Step | 18 | Powered Rotation Reverse | |
| Purge | 3 | Powered Rotation Reverse | |
| Coast EOP | 2 | Non-Powered Rotation Reverse | Optional Regenerative Braking |
| Forward Blower | 3 | Non-Powered Rotation Forward | |

*Fig. 8*

REVERSING BLOWER ADSORPTION UTILIZING COASTING

CROSS-REFERENCE TO RELATED APPLICATIONS

This application claims benefit under Title 35, United States Code §119(e) of U.S. Provisional Application No. 62/098,052 filed on Dec. 30, 2014.

FIELD OF THE INVENTION

The following invention relates to reversing blower adsorption based air separation systems. More particularly, this invention relates to adsorption based air separation systems which use a reversing blower to drive air into the adsorption bed and to reverse to pull gas out of the adsorption bed, with blower coasting rather than motor drive for at least part of the cycle and optional power generation.

BACKGROUND OF THE INVENTION

The production of oxygen using vacuum swing adsorption (VSA) is well-known to air separation technologists. VSA offers a simple non-cryogenic method to produce gaseous oxygen at purities of 80% to 95%. In the last 20 years oxygen VSA plants have become widespread and are offered in various bed configurations. The multi-bed VSA is typically used in the size rage of 60 tons per day (TPD) and higher. The single bed process was adopted as a lower capital, simpler process for lower production ranges, typically 1 TPD up to 40 TPD. Typical single bed systems usually consist of a single blower train that is used for both the feed air provider as well as the regeneration vacuum system. The process usually incorporates automatic valves to direct the air and vacuum flows during the cycle. A newer embodiment of the single bed process uses a reversing blower to generate the feed stream and apply vacuum for the regeneration step. This latest embodiment is well suited for small to medium sized oxygen VSA production plants (1 to 10 TPD). One example of a single bed reversing blower (SBRB) VSA process of this type is described in U.S. Pat. No. 8,496,738.

Although the single bed reversing blower (SBRB) VSA process is simple in practice, its simplicity comes with performance trade-offs when compared to multi-bed systems. Firstly, the lack of additional adsorber beds does not allow for a crucial bed to bed equalization. The pressure equalization step is key to lowering power consumption and increasing product oxygen recovery. Technologists in the art have overcome this deficiency by adding an equalization tank to the SBRB system (such as equalization tanks in SBRB systems provided by Air Liquide of Houston, Tex.).

Another problem with single bed reversing blower VSA systems is the inefficiency associated with energy lost as the motor reverses direction. The motor needs to slow down quickly then accelerate in a reverse direction within just a few seconds. Resistive electric breaking is typically used, but this generates significant heat which has no benefit to the VSA system, but rather is merely lost energy. Thus, a need exists for SBRB systems, such as VSA adsorption systems which reverse the blower more efficiently and effectively.

SUMMARY OF THE INVENTION

According to this invention, one technique is to utilize coasting during portions of the cycling of the reversing blower VSA process. Such coasting reduces capital hardware costs by having kinetic energy transferred via a reversing motor connected to a rotary lobe blower. The air flow produced by the blower is taken from an adsorption vessel filled with molecular sieve material. When a predetermined vacuum is reached for recharging of the molecular sieve material, the motor is turned off. The pressure difference across the blower causes the blower to quickly stop and reverse direction, thereby initiating the next step of the process without using electrical energy to brake and reverse the rotary lobe blower. A similar process can also be used at the end of the feed forward stage when pressure in the adsorption vessel acts on the again coasting blower in "off mode" to quickly decelerate the blower to a stop and accelerate it in reverse.

Pressure sensors are provided on the vessel and their rate of change is dynamically analyzed to determine when to reapply power. Typically power is reapplied after a significant portion of the energy stored in the pressure difference between the vacuum inside the adsorption vessel and the surrounding atmosphere has already been utilized, so that air can be fed into the adsorption vessel at the desired pressure for optimal gas separation by selective adsorption. Energy savings of approximately twenty percent can be achieved by utilizing such coasting an optimal amount.

The system and method of this invention can be utilized with single bed reversing blower (SBRB) air separation units, as well as other revering blower utilizing air separation units. The air separation units can be of a vacuum swing adsorption variety or a pressure swing adsorption variety and still benefit from the coasting and/or regenerative power harvesting and utilizing details of this invention.

As an alternative with this invention, one can capture excess energy created during blower motor acceleration, such as during feed forward/pressure and reverse recovery/vacuum cycles. This excess energy is captured and stored as electrical energy and delivered back to other system components. For instance, a regenerative variable frequency drive is used to control the motor/blower of a reversing blower VSA system. When the rotation direction is reversed, the potential energy stored in the adsorption vessel in the form of high pressure gas, tends to make the blower accelerate beyond the target speed of the motor. During this time, the motor becomes a generator and the excess electrical energy can be stored for later use by the motor or delivered to other variable frequency drives via a common DC bus. Any leftover energy can be delivered back to the source.

OBJECTS OF THE INVENTION

Accordingly, a primary object of the present invention is to provide a reversing blower adsorption based air separation unit which only drives the blower in a forward or reverse direction part of the time, allowing the blower to coast some of the time for enhanced performance.

Another object of the present invention is to provide a reversing blower adsorption based air separation unit which only drives the blower in a forward or reverse direction part of the time, and with at least a portion of remaining time allowing the blower to harvest energy through a power output, for storage and later use of such produced energy.

Another object of the present invention is to provide a reversing blower adsorption based air separation unit which has greater power efficiency by utilizing coasting and/or regenerative power generation.

Another object of the present invention is to provide a reversing blower adsorption based air separation unit which utilizes coasting to minimize wear and maximize service life, and increase time between necessary service intervals for the air separation unit.

Another object of the present invention is to provide a method for operation of a reversing blower adsorption based air separation system with the method enhancing efficiency, and decreasing stress on components of the blower and its drive system.

Other further objects of the present invention will become apparent from a careful reading of the included drawing figures, the claims and detailed description of the invention.

BRIEF DESCRIPTION OF THE DRAWINGS

FIG. 4 also includes a schematic depiction of a driving system for the reversible blower, which can optionally also function as a regenerative power generator through a motor which can also function as a generator, or through utilization of a power output arrangement for placing a load on the blower and to draw power off of the blower when it is driven by a pressure gradient across the blower, in either a forward or reverse direction.

FIG. 8 is a table further identifying stages of operation of the air separation unit cycle, including time duration of individual stages in seconds for a typical system, and the mode of operation of the blower during various phases of operation of the air separation unit, according to this invention.

DESCRIPTION OF THE PREFERRED EMBODIMENT

Figure 1:
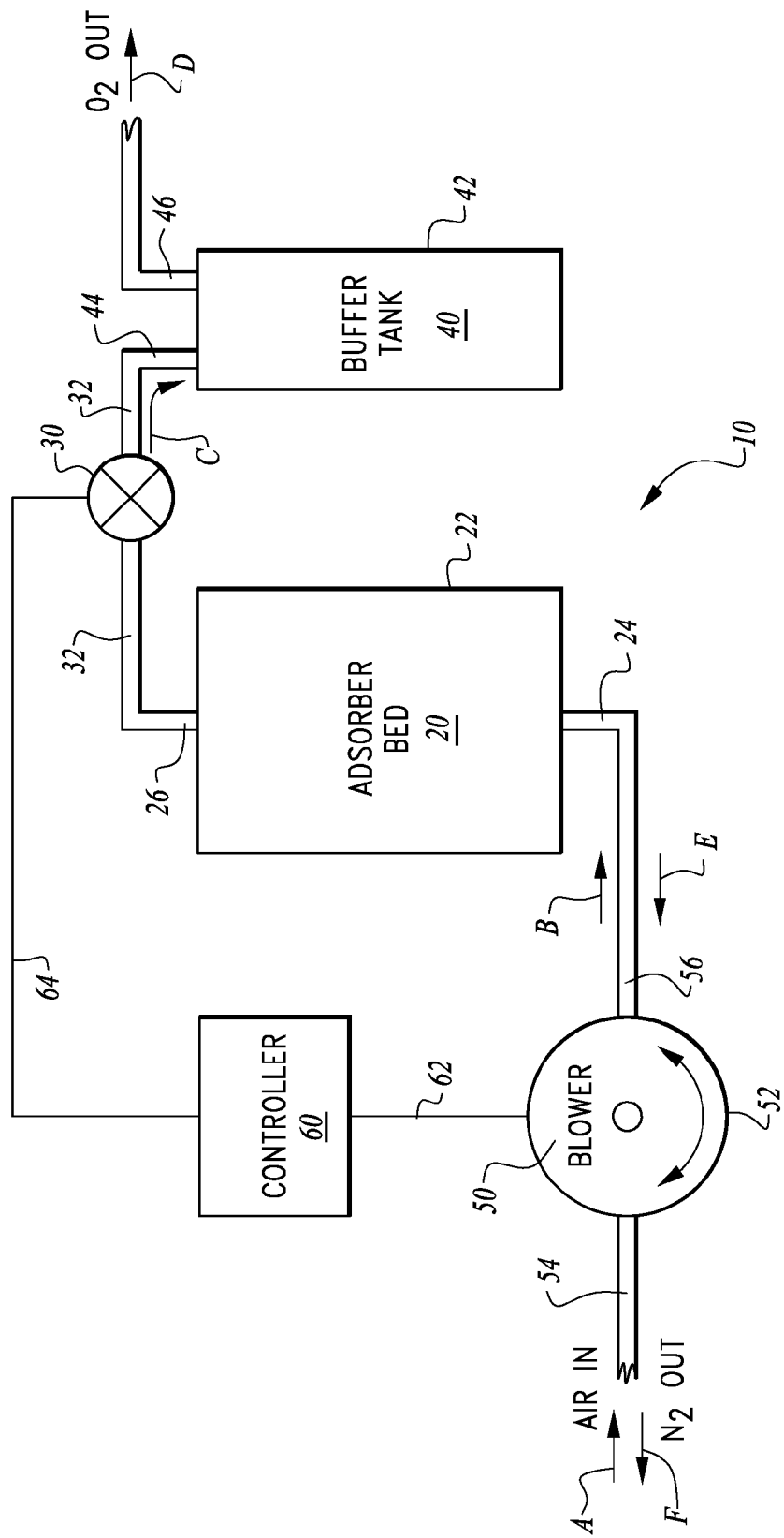
FIG. 1 is a schematic of a prior art single bed reversing blower vacuum swing adsorption air separation unit as an example of the technology to which this invention can be addressed.

Referring to the drawings, wherein like reference numerals represent like parts throughout the various drawing figures, reference numeral 10 (FIG. 1) is directed to a prior art oxygen separator configured to separate/concentrate oxygen from air. This separator is modified by the air separation unit 110 of this invention (FIGS. 2-5) and the blower driving system 210 of this invention (FIG. 4), as explained in detail below.

In essence, and with particular reference to FIG. 1, basic details of the oxygen separator 10 modified by the air separation unit 110 and blower driving system 210 of this invention are disclosed. The oxygen separator 10 includes an adsorber bed 20 including an adsorber material therein which preferentially adsorbs nitrogen, $CO_2$ and water over oxygen. A valve 30 is located downstream of the adsorber bed 20. A buffer tank 40 is provided downstream of the valve 30. A blower 50 defines a preferred form of pump located upstream of the adsorber bed 20. A controller 60 is coupled to the valve 30 and the blower 50 (or other pump) to control opening and closing of the valve 30 and to control a direction in which the blower 50 (or other pump) is operating, to either provide air into the adsorber bed 20 or pull a vacuum to desorb and remove nitrogen out of the adsorber bed 20. Normally, a heat exchanger is required between the blower and the adsorber bed to remove the heat generated when the air is compressed. The heat exchanger may be bypassed during the vacuum phase of the cycle.

With continuing reference to FIG. 1, details of the adsorber bed 20 are described. The adsorber bed 20 includes an enclosure 22 for containing the adsorber material. This enclosure 22 includes an inlet 24 spaced from an outlet 26. The inlet 24 and outlet 26 define preferred forms of first and second ports for access into the enclosure 22. The inlet 24 and outlet 26 normally are incorporated in closures or "end plates" which can be removed to allow access to the adsorption components in the enclosure 22. Otherwise, the enclosure 22 is preferably sealed to prevent leakage of gases into or out of the enclosure 22.

The adsorber material within the adsorber bed 20 could be any form of material which preferentially adsorbs nitrogen over oxygen. One such material is molecular sieve such as nitroxy siliporite. This material is preferably supplied in the form of beads which are either generally spherical in form or can be of irregular shape. Since the beads are composed of molecular sieve material within the enclosure 22, gaseous pathways extend through, between and around the adsorbent material.

Most preferably, a plenum is configured at the inlet and the outlet end of the adsorber bed to provide even gas flow across the cross section of the bed. In a preferred configuration, the inlet 24 is located below the outlet 26, and with the inlet 24 at a lowermost portion of the enclosure 22 and the outlet 26 on an uppermost portion of the enclosure 22. The enclosure 22 could have a variety of different shapes. In one embodiment, the enclosure 22 could be generally rectangularly shaped. The enclosure could be shaped like a pressure vessel to maximize an amount of vacuum to be drawn on the enclosure 22 while minimizing an amount of material strength (i.e. wall thickness or material choice) that must be designed into the enclosure 22. If the size of the adsorber material is sufficiently small to potentially pass through the inlet 24 or outlet 26, filters are provided at the inlet 24 and outlet 26 to keep the adsorbent material within the enclosure 22.

With continuing reference to FIG. 1, details of the valve 30 are described. The valve 30 is interposed on a line 32 extending from the outlet 26 of the adsorber bed 20 and extending to the buffer tank 40. This line 32 is preferably substantially rigid, especially between the valve 30 and adsorber bed 20, so that when a vacuum is drawn on the adsorber bed 20, the line 32 does not collapse. The valve 30 is preferably sealed to prevent leakage in any manner when in a closed position and to only allow passage of gas along the line 32 when in an open position.

The valve 30 is preferably coupled to a controller 60 which controls the opening and closing of the valve 30.

Optionally, the valve 30 could have a controller built into the valve 30 that could be set a single time and then operate in accordance with its settings.

While the valve 30 would typically be programmed once and then operate in accordance with such settings, the valve 30 could optionally be controlled at least partially through a control system including sensors and feedback to the valve 30. For instance, an oxygen sensor could be provided adjacent the valve 30 or along the line 32 between the valve 30 and the adsorber bed 20 to detect oxygen concentration levels approaching the valve 30. Nitrogen adjacent the valve 30 would be indicative that the adsorbent material within the adsorber bed 30 is saturated with nitrogen and that the oxygen separator 10 needs to change operating modes, to have the blower 50 (or other pump) reverse to pull a vacuum and desorb nitrogen from the adsorber material and pull the nitrogen out of the adsorber bed 20 to recharge the system.

Normally control of the cycle is achieved with the use of pressure transducers which reverse the blower at appropriate times. Usually the purge cycle is initiated when the vacuum reaches a certain predetermined level. The valve 30 is then opened for a predetermined amount of time so that a purge layer of oxygen is allowed to purge the remaining nitrogen from the bed. So the pressure and vacuum cycle are determined by pressure and the purge portion of the cycle is timed.

Other sensors could also potentially be utilized to allow the oxygen separator 10 to operate most effectively. The valve 30 is preferably of a type which operates with a minimum of lubricant or which can operate with a lubricant which is compatible with the handling of oxygen. The valve 30 and other portions of the oxygen separator 10 are also preferably formed of materials which are compatible with the handling of oxygen. For instance, brass is often effective in handling of oxygen and so brass is one material from which the valve 30 could be suitably manufactured when the system 10 is used for oxygen separation.

With continuing reference to FIG. 1, details of the buffer tank 40 are described. The buffer tank 40 is not strictly required for operation of the system, but allows for the system in the form of the oxygen separator 10 to deliver oxygen substantially continuously, and to moderate pressure spikes in the system. The buffer tank 40 includes an enclosure 42 with an input 44 and an output 46 in FIG. 1. However, normally the buffer tank does not have a separate inlet and outlet. Since its purpose is simply to be an accumulator and minimize the pressure fluctuations inherent in the pressure swing adsorption process. The input 44 is coupled to the line 32 on a side of the valve 30 downstream from the adsorber bed 20.

The buffer tank 40 would typically have some form of regulator valve on the output 46 which would deliver oxygen out of the buffer tank 40 when oxygen is required by oxygen utilizing systems downstream of the buffer tank 40. The input 44 of the buffer tank 40 can remain in fluid communication with the valve 30. The buffer tank 40 can contain oxygen at above atmospheric pressure and at a pressure matching or slightly below an operating pressure of the adsorber bed 20 when the adsorber bed 20 is actively adsorbing nitrogen and oxygen flows into the buffer tank 40.

A sensor can be associated with the buffer tank 40 which cooperates with the controller 60 to shut off the oxygen separator 10 when the buffer tank 40 nears a full condition. In many applications a compressor is located downstream from the buffer tank 40 to fill oxygen vessels. When the vessels are full the system would be shut off. If required, a pressure regulator can also be provided on the output 46 of the buffer tank 40 so that pressure of oxygen supplied out of the buffer tank 40 remains substantially constant. Similarly, an oxygen pump could be provided downstream of the buffer tank 40 if the oxygen were required to be supplied at an elevated pressure above pressure within the buffer tank 40.

Most preferably, the buffer tank 40 is not a particularly high pressure tank so that the oxygen separator 10 including the blower 50 (or other pump) and adsorber bed 20 do not need to operate at a particularly high pressure when delivering oxygen to the buffer tank 40. By minimizing the pressure of the buffer tank 40, the weight of the buffer tank 40 (and other components of the system 10) can be significantly reduced. Furthermore, the power consumed by the blower is reduced as the pressure drop across the blower is reduced.

With continuing reference to FIG. 1, details of the blower 50 (or other pump) are described. This blower 50 generally includes a housing 52 with some form of prime mover therein coupled to a driver, such as an electric motor. The housing 52 of the blower 50 includes an entry 54 in direct access with a surrounding environment in a preferred embodiment. A discharge 56 is also provided on the housing 52 which is located on a side of the blower 50 closest to the adsorber bed 20.

The blower 50 is preferably in the form of a two or three lobed rotary blower coupled in direct drive fashion to an electric motor. In one embodiment the electric motor is a five horsepower three phase motor and the rotary blower is a two or three lobed blower and can deliver approximately one hundred cubic feet per minute when operating at atmospheric pressure. This rotary blower is also preferably configured to have acceptable performance when drawing a vacuum on the adsorber bed 20.

The lobes of the rotary blower are preferably configured so that they are of approximately similar efficiency in moving gases through the blower 50 between the entry 54 and the discharge 56 in either direction. In one form, the lobes are thus symmetrical in form so that they act on the air similarly in both directions of rotation for the blower 50.

The blower 50 is preferably substantially of a positive displacement type so that it maintains an adequate performance when drawing a vacuum on the adsorber bed 20 so that nitrogen can be effectively desorbed from the adsorber material in the adsorber bed 20 when the blower 50 is operating in a reverse direction to pull nitrogen out of the adsorber bed 20 and deliver the nitrogen out of the entry 54.

Most preferably, the blower 50 is coupled in direct drive fashion to the electric motor (or though a gear box). Most preferably, the electric motor is a three phase alternating current motor which can easily be reversed by reversing two of the phases. In this way, the controller 60 need merely reverse two poles of the three phase motor. In an other embodiment a direct current, permanent magnet may be used wherein the direction of the rotation can be reversed by reversing the polarity which in turn will reverse the rotation of the blower. Almost all three phase electric motors are capable of being reversed as above. Direct current motors are also readily available from many manufacturers which reverse their rotation direction by changing polarity.

Other types of pumps could alternatively be utilized for drawing air into the adsorber bed 20 and pulling nitrogen out of the adsorber bed 20 for the oxygen separator 10. For instance, such a pump could be a positive displacement pump, such as a piston pump or a peristaltic pump. Other forms of positive displacement pumps could also be utilized including gerotor pumps, gear pumps, etc. Other forms of pumps rather than strictly positive displacement pumps could also be selected, such as centrifugal pumps or axial flow pumps. The most efficient scheme for pumping the air into the system and exhausting the bed depends on the requirements of the final user.

With continuing reference to FIG. 1, details of the controller 60 are described according to a preferred embodiment. The controller 60 is shown as a separate unit coupled to the blower 50 (or other pump) through a blower signal line 62 and coupled to the valve 30 through a valve signal line 64. The controller 60 could in fact be integrated into the valve 30 or integrated into the blower 50 (or other pump) or be provided as a standalone unit such as depicted in FIG. 1. It is also understood that the controller 60 could be split into two (or more) separate devices, either separate from the blower 50 and valve 30 or integrated into both the blower 50 and valve 30.

The controller 60 provides the basic function of controlling a direction in which the blower 50 is operating and whether the valve 30 is open or closed. Control systems have been used which simply time the cycle. More often, the controller is configured to react to pressure or some other input.

A preferred sequence for directional control of the blower 50 and opening and closing of the valve 30 are described in detail below. The controller 60 could be in the form of a programmable logic device or could be in the form of an application specific integrated circuit, or could be in the form of a CPU of a special purpose computer or a general purpose personal computer or other computing device. The controller 60 could be configured to have operating parameters set at a central controlled location, such as during manufacture, or could be configured to allow for programming in the field before and/or during operation.

In use and operation, and with particular reference to FIG. 1, details of the operation of the oxygen separator 10 of the prior art are described. It will be understood that the separator 10 would operate similarly when separating other gases than when separating oxygen from air, and the operation as an oxygen separator 10 is provided merely as one example.

Initially, the system 10 is configured with the valve 30 closed and the blower 50 (or other pump) is caused to rotate in a direction driving gases out of the adsorber bed 20 (along arrow E). This is the vacuum cycle used to desorb nitrogen out of the beads in the bed 20. In particular, the blower 50 rotates to cause gases to be pulled into the entry 54 (along arrow E). This gas is removed from the bed 20 by the blower 50 and caused to pass through the discharge 54 away from the adsorber bed 20 along arrow F and to the surrounding atmosphere.

Nitrogen (or other undesirable gas) is adsorbed by the adsorber material within the adsorber bed 20. Most typically, the adsorber material also adsorbs water vapor and carbon dioxide, as well as potentially trace amounts of other gases, including pollutants.

During the last portion of the vacuum cycle valve 30 is opened to allow a small amount of the contents of the buffer tank to be introduced into the adsorber bed. This step is called the "purge phase." The purge phase is used to purge nitrogen (as well as some carbon dioxide and water out of plumbing lines and free space between the valve 30 and the blower 50, but not appreciably out into the surrounding atmosphere. This short purge phase is typically timed to match an amount calculated or determined by experiment, but could also be ended based on sensor readings. This purge phase ends the vacuum cycle and precedes the adsorption cycle to follow.

The blower is then reversed to commence the adsorption cycle. Air is drawn into the blower at the inlet 54 port of the blower 50 (in the direction shown by arrow A). The air flows (along arrow B) into the adsorber bed 20 where nitrogen, carbon dioxide, and water are preferentially adsorbed. The gas not adsorbed in the adsorber bed (normally a mixture of oxygen and argon) is passed through valve 30 into the buffer tank 40.

The adsorber bed 20 might also adsorb oxygen to some extent. However, the adsorber material is selected so that it preferentially adsorbs nitrogen more than oxygen. Due to the presence of the adsorber material within the adsorber bed 20, substantially only oxygen (or other desirable gas) can leave the adsorber bed 20 through the outlet 26. Typically, argon also remains with the oxygen. Because air is approximately 1% argon and approximately 20% oxygen, this twenty to one ratio typically causes the gases being discharged from the adsorber bed 20 at the outlet 26 to be approximately 95% oxygen and 5% argon.

Because the valve 30 is opened, this oxygen can flow (along arrow C) through the valve 30 and into the buffer tank 40. The buffer tank 40 is thus charged with oxygen. If oxygen is desired, it can be discharged from the buffer tank 40 output 46 (along arrow D). The adsorber material within the adsorber bed 20 eventually becomes saturated with nitrogen and other compounds, such as water vapor and carbon dioxide. The point of such saturation can be calculated in advance and calibrated into the separator 10. Alternatively, a sensor can be provided, such as along the line 32 adjacent the valve 30, to sense for nitrogen or other contaminants within what should be substantially only oxygen and argon. Such a sensor can cause the system to detect such saturation of the adsorbent material within the adsorber bed 20 and thus change the mode of operation of the oxygen separator 10 from the adsorption cycle to the vacuum cycle. Other sensors to trigger the change could be pressure sensors or volumetric flow rater sensors either alone or in combination with a clock or a calibration table. The goal is to prevent nitrogen or other contaminates from passing the valve 30 after adsorption bed 20 saturation.

When such saturation has either been sensed as occurring or predicted to occur, the separator 10 changes operation modes by closing the valve 30. Then the blower 50 (or other pump) reverses its direction of operation. For instance, the controller 60 can reverse two of the three phases of a three phase electric motor coupled to the blower. The blower 50 is then caused to turn in an opposite direction and begins pulling gas (along arrow E) out of the adsorber bed 20 and into the blower 50 from the discharge 56 and out of the blower 50 through the entry 54 and out into a surrounding environment, as a repeat of the vacuum cycle described above.

The controller 60 can be programmed with a typical amount of time required to effectively desorb the nitrogen from the adsorbent material within the adsorber bed 20. Normally, the controller 60 senses a threshold low pressure in the adsorber bed 20. The system operation then continues as described above with a short purge phase followed by return to the desorption cycle.

This operating sequence for the oxygen separator 10 can repeat itself potentially indefinitely. When the buffer tank 40 becomes full (or vessels being filled from the buffer tank 40 are full), an appropriate sensor associated with the buffer tank 40 can indicate that it is full and shut off the oxygen separator 10. As further amounts of oxygen are sensed as being needed, such as by a drop in pressure in the buffer tank 40, a signal can be sent to the controller 60 to again cause the system to commence operation.

With this invention a modified air separation unit 110 implements a modification of the prior art single bed reversing blower (SBRB) vacuum swing adsorption (VSA) oxygen separator 10 through the air separation unit 110 of this invention and the driving system 210 described in more detail below. The SBRB VSA air separation unit (ASU) 110 is modified in this exemplary ASU 110 to include a purge recovery tank 160. Many other portions of the ASU 110 have analogs in the prior art SBRB VSA technology such as that shown in FIG. 1.

Figure 2:
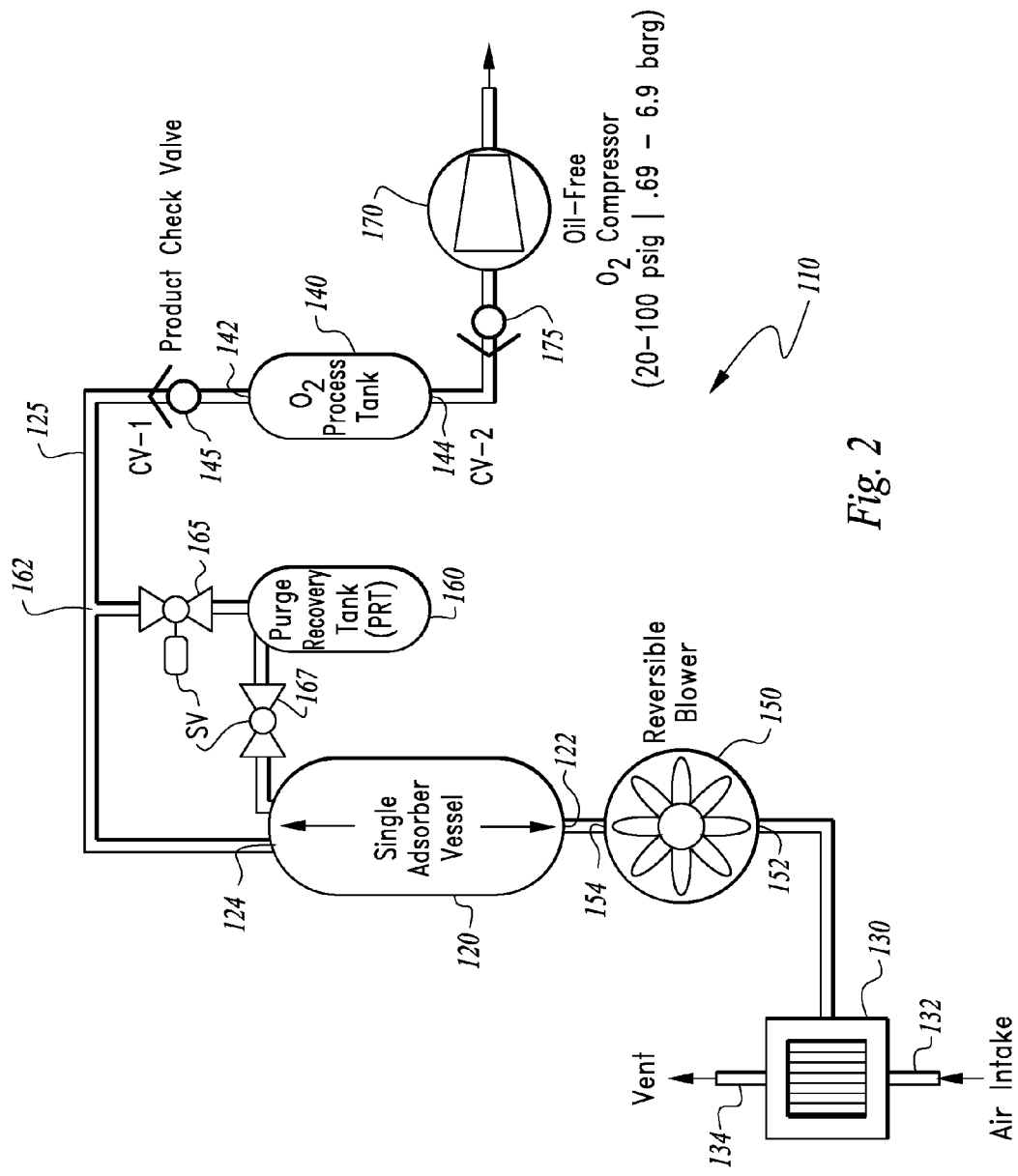
FIG. 2 is a schematic of a single bed reversing blower vacuum swing adsorption air separation unit incorporating a purge recovery tank therein to enhance performance of the air separation unit and defining a modified vacuum swing adsorption air separation process for use in one embodiment of this invention.

In essence, and with particular reference to FIG. 2, basic details of the ASU 110 are described, according to a preferred embodiment with the ASU 110 also typically including many of the details of the oxygen separator 10 as described above. A single adsorber vessel 120 is fed by an intake 130 which supplies air to the vessel 120. Downstream of the vessel 120, an $O_2$ supply line 125 leads to an $O_2$ process tank 140 which is optionally provided to contain excess $O_2$ before it is utilized by equipment and/or for processes downstream of the $O_2$ process tank 140. A reversible blower 150 is interposed between the adsorber vessel 120 and the intake 130. A purge recovery tank 160 is coupled to the $O_2$ supply line 125 downstream of the vessel 120, preferably through a control valve 165 to control whether the purge recovery tank 160 is open or closed. A compressor 170 is preferably provided downstream of the $O_2$ process tank which can control pressure of $O_2$ supplied from the ASU 110.

More specifically, and with continuing reference to FIG. 2, specific details of the ASU 110 are described. The single adsorber vessel 120 extends between an inlet 122 and an outlet 124, with the inlet 122 defining a side of the vessel 120 closest to the intake 130 and the outlet 124 on a side of the vessel 120 opposite the inlet 122. This vessel 120 can have any of a variety of configurations. While this vessel 120 is described as a single adsorber vessel 120, it is conceivable that a manifold upstream and downstream of the single adsorber vessel 120 could be provided so that multiple vessels 120 could be provided in parallel, but operating in unison so that the ASU 110 is still functioning as a single bed reversing blower (SBRB) system but with optionally additional vessels 120 merely to adjust size of the vessel 120.

The vessel 120 contains an adsorption material which preferentially adsorbs $N_2$ over $O_2$. This material is typically provided in the form of beads or other solid media which allow for gas to flow about the solid media as the gas extends from the inlet 122 to the outlet 124, and past surfaces of the adsorption material. Surfaces of the adsorption material adsorb nitrogen thereon, allowing $O_2$ to pass through the vessel 120. Typically, the material within the vessel 120 also adsorbs water vapor and various other gases, while typically argon within the air is not adsorbed but passes out of the vessel 120 along with the oxygen. The vessel 120 includes a container wall which is sufficiently strong so that it can maintain its volume when experiencing pressures ranging from near vacuum at a low end to approximately atmospheric (but potentially slightly higher than atmospheric pressure) at a high end.

The intake 130 in a simplest form merely includes an opening which is open to a surrounding atmosphere for intake of air into the ASU 110. In the embodiment depicted, the intake 130 can include some form of filter element, such as a particulate filter and includes an air port 132 spaced from a purge port 134. A valve within the intake 130 causes air to be drawn in through the air port 132 when the blower 150 is drawing air into the vessel 120, and the purge port 134 discharges gas (including mostly $N_2$) when the blower 150 has reversed and is pulling gas out of the vessel 120. The purge port 134 is preferably spaced from the air port 132 to minimize the potential for nitrogen exhaust to find its way back into the air port 132. If desired, the purge port 134 can lead to other equipment such as nitrogen recovery equipment.

Figure 4:
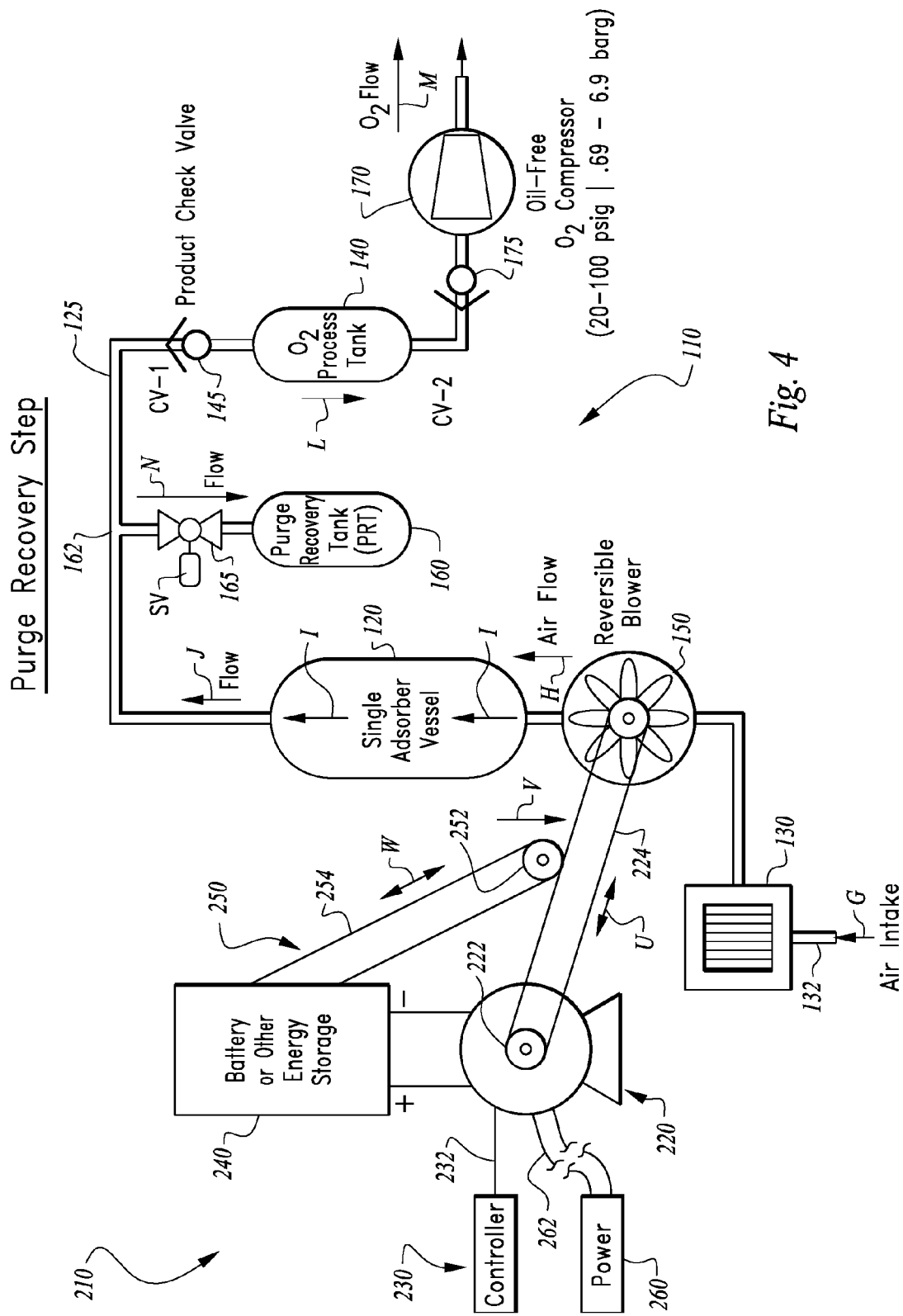

Regions downstream of the vessel 120 are together generally referred to collectively as the $O_2$ output in that gas of mostly $O_2$ remains in these portions of the ASU 110. The $O_2$ process tank 140 could be avoided in systems where oxygen is used as it is produced or where discharge of excess $O_2$ beyond that utilized by the equipment downstream of the ASU 110 can merely be discharged to atmosphere, or can be avoided in systems where downstream equipment from the ASU 110 itself includes appropriate volume, such as in the form of tanks or other equipment so that the $O_2$ process tank 140 is not needed. However, typically an $O_2$ process tank 140 is provided to hold excess $O_2$ produced when the reversible blower 150 is driving air into the vessel 120 and the ASU 110 is producing $O_2$, so that when the blower 150 reverses and the vessel 120 is in recovery mode and discharging nitrogen therefrom, $O_2$ can continue to be supplied from the $O_2$ process tank 140 to supply downstream oxygen utilizing equipment (FIG. 4).

Most preferably, a product check valve 145 is provided upstream of the $O_2$ process tank 140. This check valve 145 acts to keep pressurized oxygen within the $O_2$ process tank 140 and preventing back flow of oxygen back toward the vessel 120. This product check valve 145 also provides one form of valve within the $O_2$ supply line 125 which the reversible blower 150 works against so that an at least partial vacuum can be drawn on the vessel 120, without significant leakage of any gases into the vessel 120 from the $O_2$ supply line 125. Such a vacuum is needed to allow for recovery of the material within the vessel 120 by causing the material to give up the $N_2$ and return to a state where it is ready to again preferentially adsorb $N_2$ and supply $O_2$ to the $O_2$ process tank 140. The $O_2$ process tank 140 includes an inlet 142 opposite an outlet 144 with the inlet 142 adjacent to the product check valve 145 and the outlet 144 leading further into equipment downstream of the ASU 110 which utilize oxygen.

The reversible blower 150 includes an inlet 152 on a side of the reversible blower 150 closest to the intake 130 and an outlet 154 on a side of the reversible blower 150 opposite the inlet 152. This reversible blower 150 is preferably a positive displacement pump, most typically of a rotary lobe variety which can both efficiently blow air through the vessel 120 to produce oxygen, but also effectively draw a vacuum on the vessel 120 when reversed. The motor coupled to the rotary lobe prime mover of the reversible blower 150 is most preferably a type of electric motor which can readily be reversed in direction, such as by reversing a polarity of an electric field associated with the electric motor, or some other type of electric motor which can be readily reversed in the direction that it is operating with a minimum of stress on the equipment associated with the reversible blower 150. Typically, a controller is coupled to the reversible blower 150 which sends a signal at an appropriate time to the reversible blower 150 to cause it to reverse from pushing air into the vessel 120 to pulling gas out of the vessel 120.

The purge recovery tank 160 is preferably provided with an opening thereinto coupled to the $O_2$ supply line 125, preferably at a junction 162 between the outlet 124 of the vessel 120 and the product check valve 145. As an alternative, the purge recovery tank 150 can be coupled directly to the adsorber vessel 120 typically at a portion of the adsorber vessel 120 on a side of the vessel 120 opposite the inlet 122.

A control valve 165 is interposed between the tank 160 and the $O_2$ supply line 125. Alternatively, this control valve 167 can be interposed between the tank 160 and the vessel 120. In either configuration, the control valve 165, 167 transitions from a closed state where the purge recovery tank 160 is isolated from the $O_2$ supply line 125 and the adsorber vessel 120 and an open state where the purge recovery tank 160 is open to the $O_2$ supply line 125 and/or adsorber vessel 120. The control valve 165, 167 is typically coupled to a servo motor so that it is in the form of a servo valve (SV).

The control valve 165 is coupled to a controller which can be coupled to or the same as the controller associated with the reversible blower 150, so that opening and closing of the purge recovery tank 160 occurs in a synchronized fashion with reversing of the reversible blower 150. If desired, such a controller or group of controllers can also be coupled to sensors such as a nitrogen sensor which can detect trace amounts of $N_2$ downstream of the vessel 120 and indicative that the material within the vessel 120 is approaching saturation and the need to enter a recovery phase by reversing the reversible blower 150 and drawing nitrogen out of the vessel 120 through drawing a vacuum within the vessel 120. The controller can optionally include a clock and reverse the blower (and open/close the valve 165, 167) after set amounts of time have passed.

The compressor 170 is optionally provided downstream of the $O_2$ supply line 125 and downstream of any $O_2$ process tank 140. Preferably a compressor check valve 175 is provided upstream of the compressor 170. The compressor 170 allows for control of a pressure desired for $O_2$ supplied from the ASU 110. The compressor check valve 175 assists in keeping $O_2$ downstream of the compressor 170 from backing up into the ASU 110.

Figure 3:
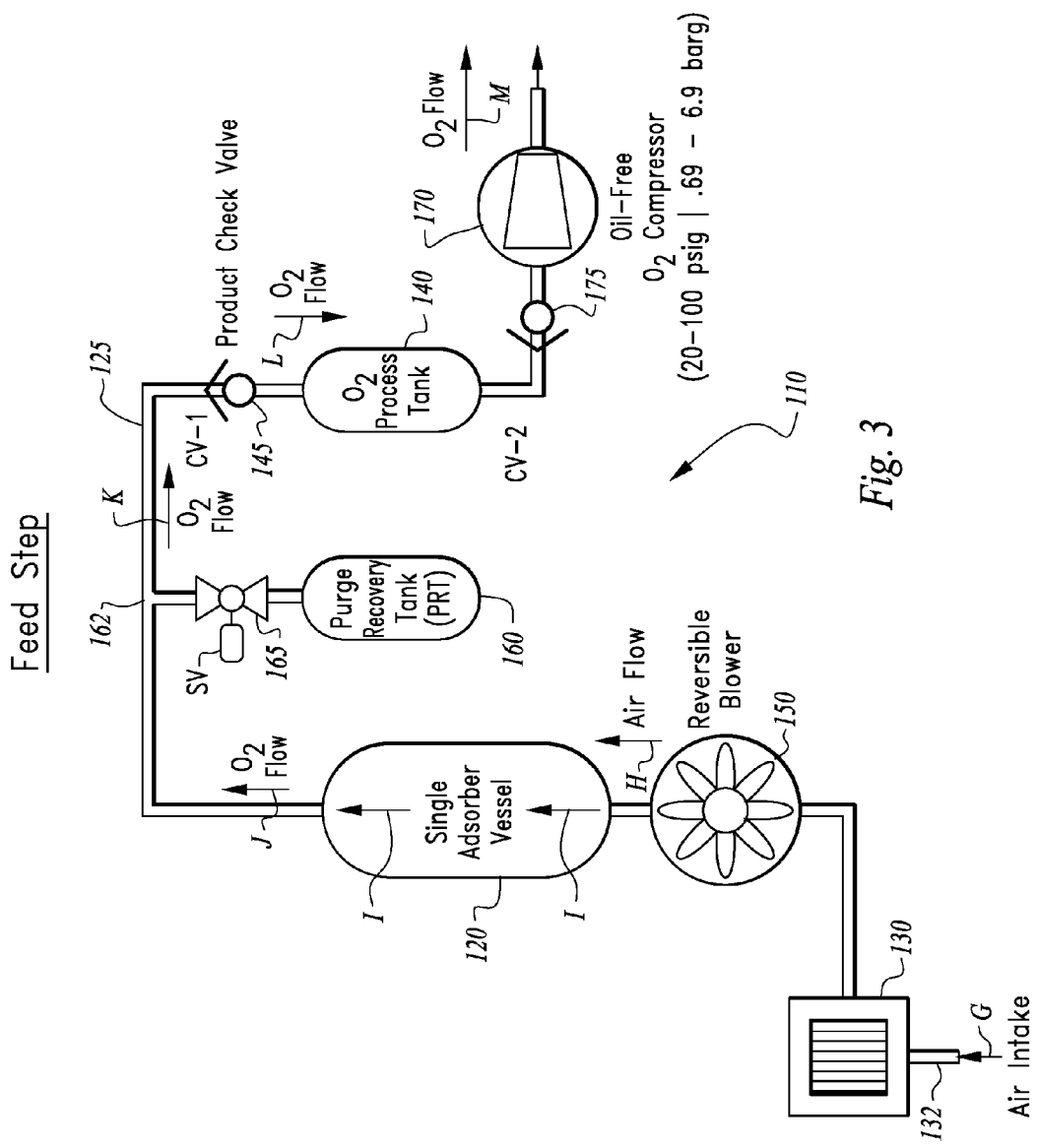
FIGS. 3-5 are schematics similar to that which is shown in FIG. 2, but with various different arrows depicting various steps in the operation of the reversing blower vacuum swing adsorption air separation unit.
Figure 5:
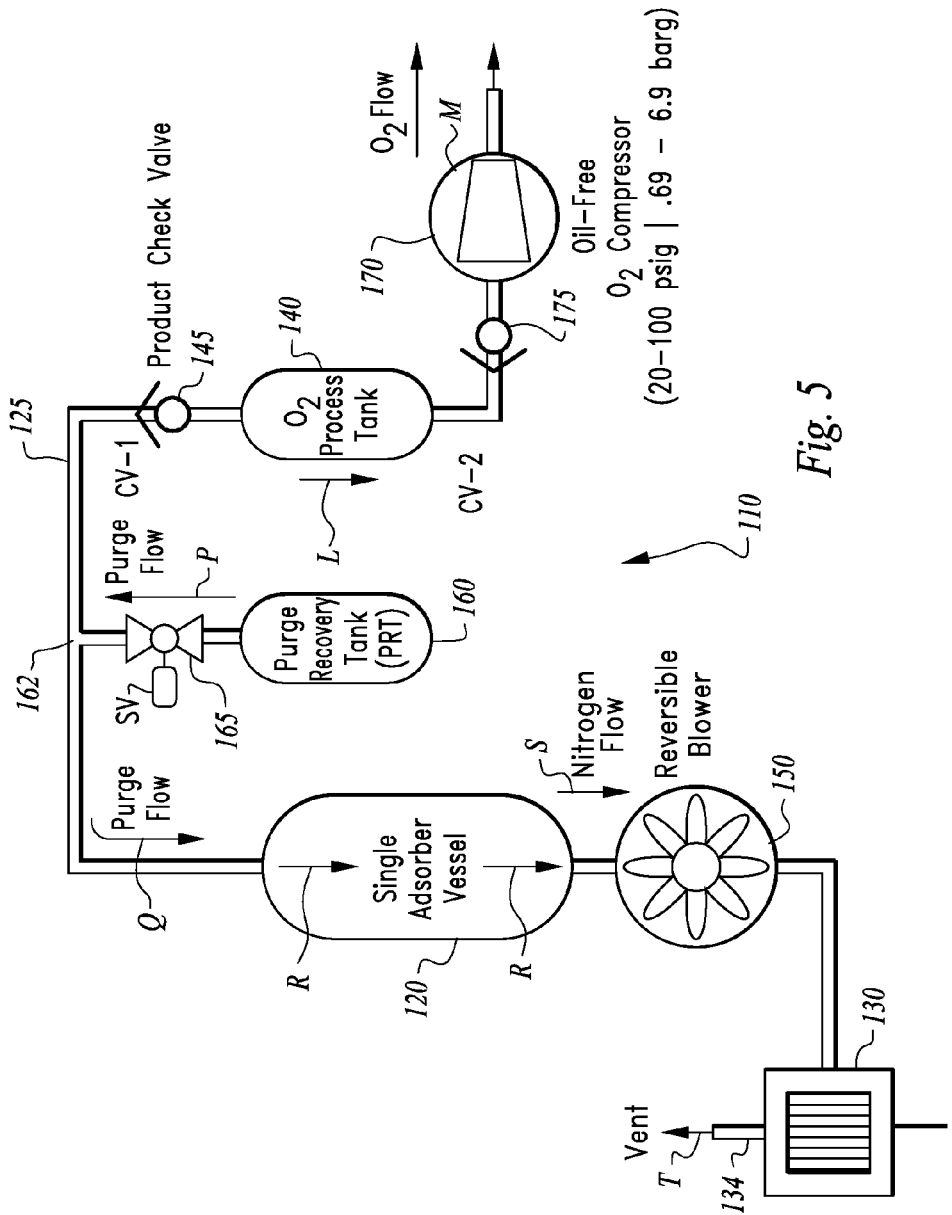
Figure 6:
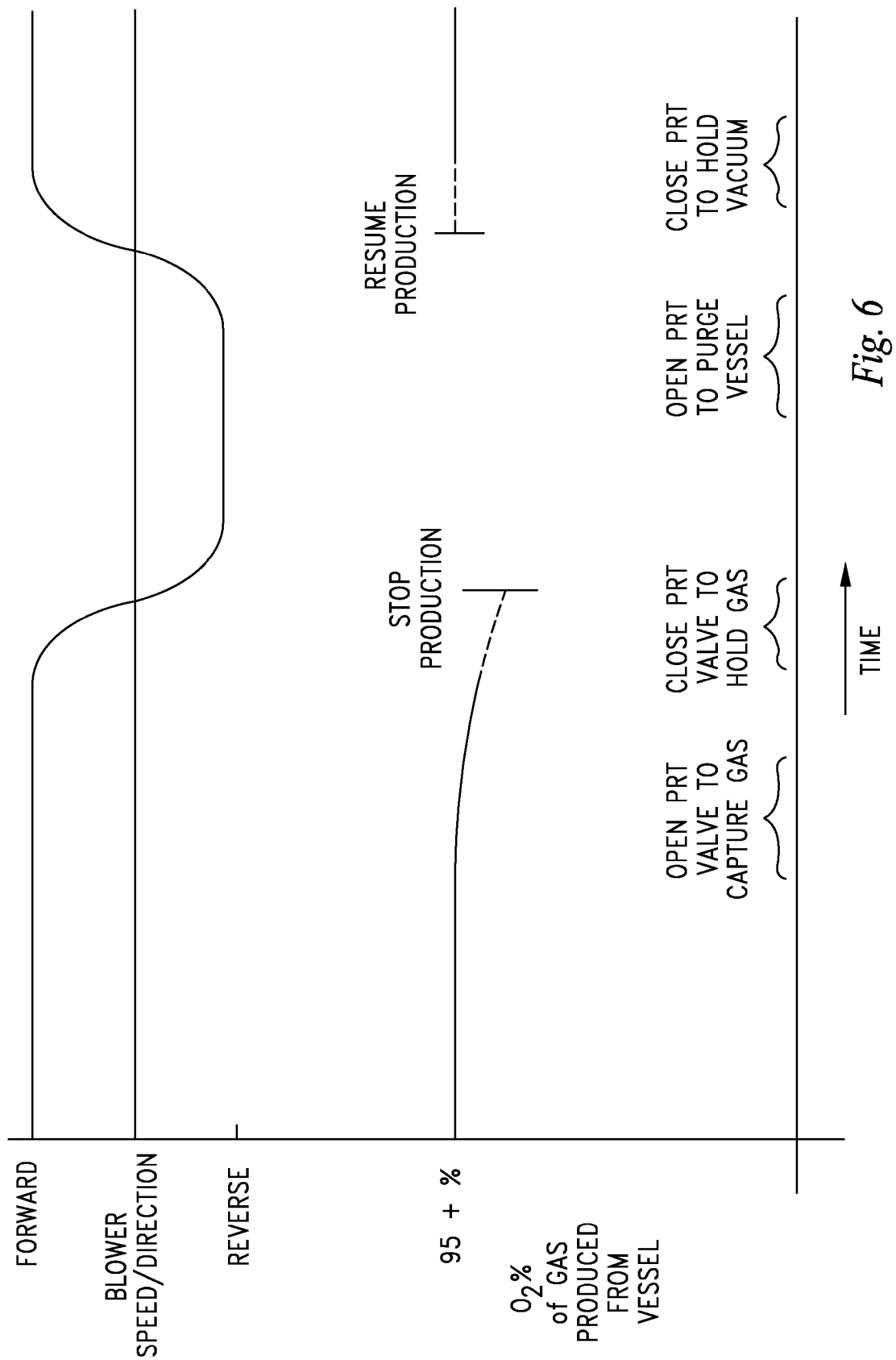
FIG. 6 is a graph depicting reversible blower speed and direction as well as $O_2$ percent of gas produced from an adsorber vessel in operation of the process of this invention, and further illustrating when the purge recovery tank is opened and closed to enhance performance of the air separation system.

With particular reference to FIGS. 3-5, general steps in operation of the ASU 110 are described. FIG. 3 depicts a feed step for the ASU 110. In this step the reversible blower 150 draws air from the air intake 130 through the air port 132, along arrow G. The blower 150 drives air along arrow H into the vessel 120. The air passes through the vessel 120 (along arrow I) where nitrogen is selectively adsorbed. Gas of mostly $O_2$ flows out of the vessel 120 (along arrow J) and within the $O_2$ supply line 125. The control valve 165 of the purge recovery tank 160 is closed during the beginning of the feed step so that $O_2$ flow continues past the junction 162 and through the $O_2$ supply line 125 (along arrow K). The oxygen then passes through the product check valve 145 and into the $O_2$ process tank 140 (along arrow L). Further, the $O_2$ can flow through the compressor check valve 175 and through the compressor 170 for discharge from the ASU 110 (along arrow M).

Such a feed step (as depicted in FIG. 3) continues as long as the material within the vessel 120 has excess capacity for adsorption of nitrogen. When this adsorption material within the vessel 120 becomes saturated with nitrogen, the ASU 110 needs to prepare for recharging the adsorption material within the vessel 120. To detect that such recharging/restoration of the material within the vessel 120 is needed, the ASU 110 can follow a timing circuit or follow gas flow valves which measure an amount of gas flow, or can include a nitrogen sensor or other sensor downstream of the vessel 120 which indicate that the gas downstream of the vessel 120 is indicative that recharging/reconditioning of the material within the vessel 120 is needed.

Preparation for recovery of the material within the vessel 120 can occur in a couple of slightly different but closely related ways. In one embodiment, such preparation begins by opening of the control valve 165 (or valve 167). The interior of the pressure recovery tank 160 preferably has pressure below atmospheric pressure so that gas of mostly oxygen (but with perhaps some nitrogen present) flows quickly into the purge recovery tank 160 through the control valve 165.

When the purge recovery tank 160 is full, or when the purge recovery tank 160 is achieving a fill level which is sufficiently great to satisfy its purposes in purge recovery for the vessel 120, the control valve 165 is closed. The purge recovery tank 160 thus contains and holds a charge of mostly $O_2$ (but typically with some $N_2$ and other contaminates present) as a purge charge which can be at near atmospheric pressure, or conceivably above atmospheric pressure if pressure downstream of the vessel 120 is above atmospheric pressure.

The reversible blower 150 is instructed to reverse so that air is no longer driven into the vessel 120, but the blower 150 reverses and gases begin to be pulled out of the vessel 120, through the reversible blower 150 and back to the intake 130. The precise moment of beginning reversing of the reversible blower 150 could be before the control valve 165 associated with the purge recovery tank 160 has closed, or could be at the same time that the control valve 165 closes, or could be slightly after the control valve 165 closes. The reversible blower 150 typically takes some time to stop moving in a forward direction and then begin moving in a reverse direction. This slow down to zero velocity and speed up in a reverse direction also define a time period which can be during which the control valve 165 closes or immediately before or immediately after the control valve 165 closes.

The reversible blower 150 then operates in a reverse direction drawing a vacuum on the adsorber vessel 120 and portions of the $O_2$ supply line 125 between the adsorber vessel 120 and the product check valve 145 or other valve on the $O_2$ supply line 125 which resists the draw of vacuum within the $O_2$ supply line 125. Pressure is thus reduced within the $O_2$ supply line 125 and the adsorber vessel 120. Gas flow through the vessel 120 occurs along arrow R of FIG. 5. As the pressure is reduced within the adsorber vessel, the ability of the material within the vessel 120 to hold $N_2$ decreases. $N_2$ is thus released from the adsorber material and flows, along arrow S (FIG. 5) through the reversible blower 150 and out of the purge port 134 of the intake 130 (along arrow T of FIG. 5). After a sufficient amount of time and sufficiently low pressure is achieved within the vessel 120 to satisfactorily allow the material within the vessel 120 to recover, the ASU 110 then undergoes preparation for re-reversing the reversible blower 150 and returning the ASU 110 back to the feed mode (FIG. 3). This preparation typically initially involves opening of the control valve 165 (or valve 167) associated with the purge recovery tank 160. The mostly $O_2$ (with some $N_2$) gas that has been stored therein is thus released through the control valve 165 and into the $O_2$ supply line 125 (or directly into the vessel 120 through the valve 167 of FIG. 2).

This purge of mostly $O_2$ with other gases into the low pressure vessel 120 allows for pressure within the vessel 120 to be quickly restored and also for the low quality purge gas which contains some $N_2$ and other contaminant gases therein to again contact the adsorption material within the vessel 120 for removal of $N_2$ and other contaminants therefrom.

Such purge flow is generally depicted by arrow P and also be arrow Q for return back into the adsorber vessel 120 (FIG. 5).

The vessel 120 has thus been fully prepared for returning back to the feed step. The reversible blower 150 can then be re-reversed to again drive airflow (along arrow H of FIG. 3) from the intake 130 (along arrow G) and through the vessel 120 (along arrow I). The control valve 165 with the purge recovery tank 160 can be closed just before the reversible blower 150 re-reverses, at the same time that the reversible blower 150 re-reverses, or shortly after the reversible blower 150 re-reverses.

Various factors such as the volume of gas which can reside within the various lines adjacent to the purge recovery tank 160 and whether the ASU 110 is to be optimized for $O_2$ purity, energy efficiency, or production rate, can be factored into determining precisely when the control valve 165 (or 167) should be returned to its closed state. Similar optimization can occur when determining when to initially open the control valve 165 and also when to initially close the control valve 165. The control valve 165 is re-closed so that it maintains a vacuum therein to make the purge recovery tank 160 most effective when it is again utilized in the next iteration of the cycle performed by the ASU 110.

With continuing reference to FIG. 4, details of the driving system 210 associated with the reversible blower 150 are described, according to a preferred embodiment of this invention. These details of the driving system 210 cause the reversible blower 150 to be operating either in a feed forward mode, driving air into the adsorber vessel, or in a recovery reverse mode drawing gas from the adsorber vessel, or in an "off" mode allowing the reversible blower 150 to either coast or to act as a generator for production of power by utilizing the pressure differential across the reversible blower 150.

In essence, and with continuing reference to FIG. 4, basic details of this driving system 210 are described, according to an exemplary embodiment. The driving system 210 includes as a central element a motor 220. This motor 220 is coupled to the reversible blower 150 to cause the reversible blower 150 to rotate in a forward or reverse direction, driving air into the adsorber vessel 120 when operating in the feed forward direction and drawing gas out of the adsorber vessel 120 when operating in the recovery reverse direction. A controller 230 is coupled to the motor 220 to control whether the motor 220 is operating to drive the blower 150 in a forward or reverse direction, or whether the motor 220 is not driving the reversible blower 150 (but rather allowing the reversible blower 150 to coast or allowing the reversible blower 150 to drive the motor 220 for power generation through the motor 220). A battery or other energy storage 240 is also optionally coupled to the motor 220 for collection of electric power when the motor 220 is operating to generate electricity. A mechanical power input 250 can optionally be provided to draw mechanical power directly from the reversible blower 150 to the battery or other energy storage 240, through a separate generator or directly to a mechanical energy storage, such as a flywheel or mechanical weight or other mechanical energy storage.

With continuing reference to FIG. 4, specific details of the driving system 210 are described, according to one exemplary embodiment. A primary purpose of the driving system 210 is to cause the reversible blower 150 to operate in the feed forward direction or in the recovery reverse direction, or to allow the reversible blower 150 to coast. The motor 220 can be any of a variety of different types of motors suited to the purpose of driving the reversible blower in two different directions. Motors which can conveniently reverse directions, such as by reversing a field within the motor, or through other motor reversing technologies which are low wear and tear on the motor 220 would be particularly desirable.

In one embodiment, the motor 220 is in the form of a regenerative variable frequency drive. Such a motor can become a generator and also acts more effectively to keep the overall system 110 from exceeding an optimal design maximum pressure (or vacuum) during portions of the cycle implemented by the system 110. In effect, the motor becomes a generator and the excess electrical energy can be beneficially utilized in other portions of the overall system 110, or can be stored, such as in a battery (or fly wheel, etc.) to later assist in driving the motor 220 and thus reduce an overall power consumption of the system 110.

The motor 220 can be configured to drive the reversible blower 150 in a variety of different ways. While an input/output shaft 222 of the motor 220 is shown coupled to a belt/chain 224 for driving (along arrow U of FIG. 4) the reversible blower 150, the motor 220 could be configured to direct drive the reversible blower 150 along a common shaft, or could utilize gears or other power transmissions to efficiently transfer power from the motor 220 to the reversible blower 150.

In one embodiment, this power transmission is configured so that power can be drawn from this transmission to the battery or other energy storage 240, such as through a mechanical power input 250. In the embodiment disclosed, for convenience an interface gear/sprocket 252 of the mechanical power input 250 is shown which can be brought into contact with the belt/chain 224 (along arrow V of FIG. 4) to engage the mechanical power input 250. The belt/chain 254 thus directs power to the battery or other energy storage 240. If to a battery, an electric power generator would be interposed between the battery 240 and the belt/chain 254.

If some form of mechanical energy storage or other energy storage is used, some other appropriate interface would be provided. For instance, in the case of a flywheel, the belt/chain 254 could merely add power in the form of rotational inertia to the flywheel through movement of the belt/chain 254 (along arrow W of FIG. 4). Other forms of mechanical energy storage could include the lifting of weights to a higher elevation, storage of energy within springs, compressed air storage, or other energy storage known in the prior art or developed in the future. As a further alternative to the battery or other energy storage 240, power could be drawn directly off and beneficially utilized within other portions of the system 110, such as to drive the compressor 170, or can be outputted from the system 110 altogether and beneficially utilized.

The controller 230 is shown coupled to the motor 220 through a cable 232 which provides a control signal to the motor 220. This control signal primarily causes the motor 220 to operate in a forward direction, a reverse direction or in an "off" mode where the motor 220 allows the blower 150 to coast or allows the blower 150 to operate in a power generation mode either through generating power within the motor 220 acting as a generator, or separately. The motor 220 is also coupled to a power source 260 through a power line 262, such as grid power or appropriately conditioned power from any available source.

When driving a reversible blower 150 cyclically between a forward direction and a reverse direction, as with the change in direction of rotation of any rotating mass, a series of different operating modes are involved. Initially, when the blower is rotating in a maximum forward speed it must be slowed down (decelerated) to a stop. It must then be accelerated in a reverse direction up to a maximum reverse speed. It must then be allowed to slow down (decelerated) to a stop again followed by acceleration in a forward direction back to a forward maximum speed. A basic operational configuration for causing a reversible blower 150 to change through these modes of operation would be to continually drive the blower 150 in either a forward direction or a reverse direction. When the blower is at a maximum forward speed, and it is desired to reverse it, the motor is reversed. The motor is now acting to decelerate the blower 150, but it is still initially rotating in a forward direction, but slowing down. It is then brought to a stop and commences rotation in a reverse direction. It continues to accelerate in a reverse direction until it reaches the maximum reverse speed. The motor then switches to driving the blower in a forward direction. The blower 150 does not immediately start rotating in a forward direction, but rather first decelerates from a faster reverse direction to a slower reverse direction and is brought to a stop. The blower then continues to be accelerated in a forward direction until it reaches its maximum forward speed again.

In such a basic configuration, the motor 220 is always "on" and driving the blower 150 in either a forward or a reverse direction. Because the adsorber vessel 120 is on one side of the reversible blower 150 and the other side of the reversible blower 150 is exposed to atmospheric pressure through the air inlet 130, a pressure differential (positive followed by negative) exists across the blower 150. This pressure differential can be beneficially utilized during portions of the operation of the blower 150 so that the drive motor 220 can be in an "off" mode some of the time and does not need to be continually driving the blower 150. Furthermore, if desired this pressure differential across the blower 150 can be beneficially utilized during portions of the operation of the cycle for power generation as disclosed above.

Figure 7:
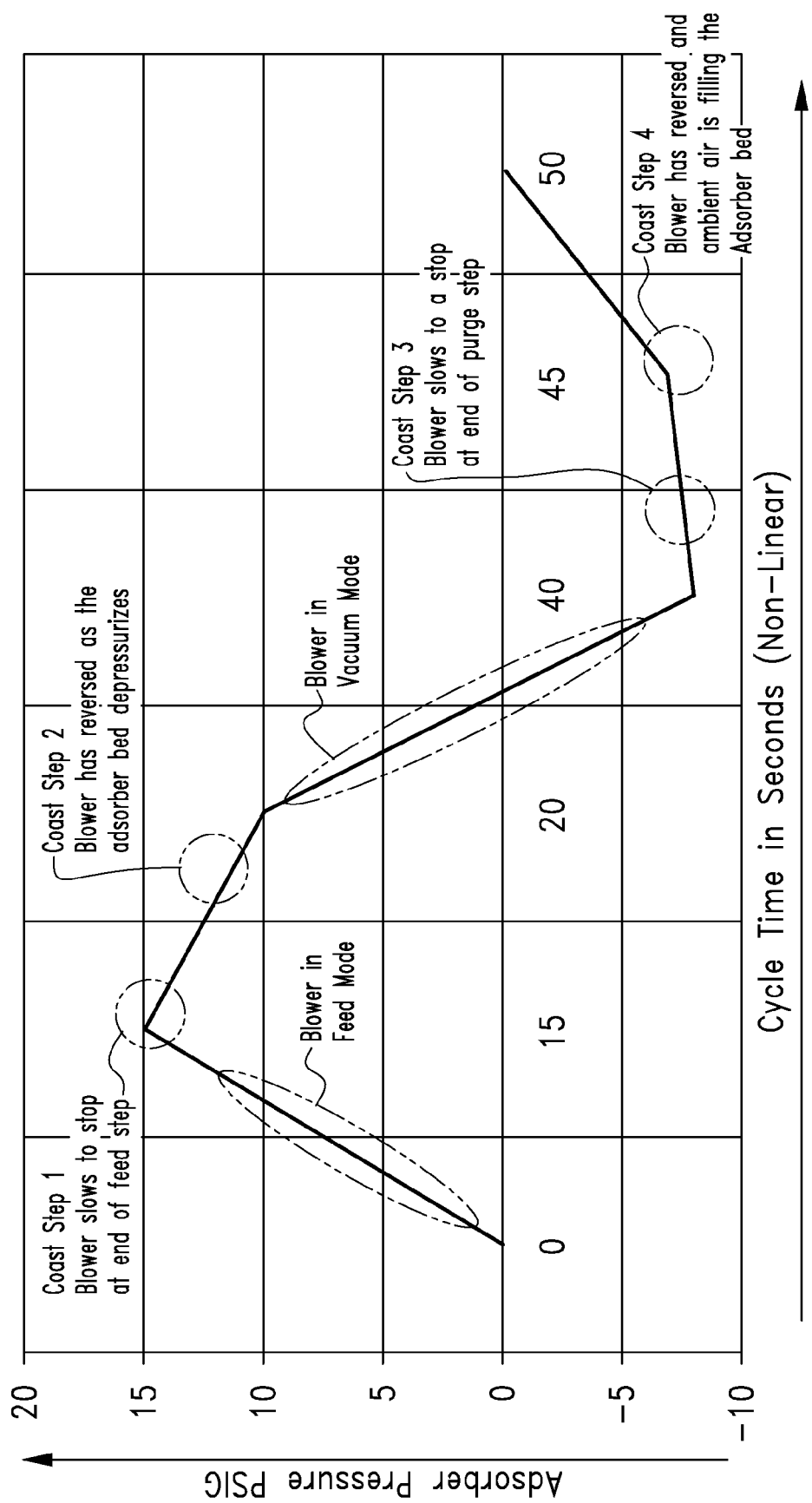
FIG. 7 is a graph of adsorber pressure vs. time during various different portions of the cycle of operation of the reversing blower air separation unit, and illustrating typical periods when coasting can be employed according to this invention.

A graph of one configuration of this cycle utilizing coasting is depicted in FIG. 7. Following a pressure line from left to right this cycle can be further described. Initially, the blower 150 is operating in a feed mode being driven in a forward direction by the motor 220. While pressure is shown to be increasing, and such would clearly be the case if there were no outlet on a side of the adsorber vessel 120 opposite the reversible blower 150, oxygen is being drawn from the $O_2$ output on a side of the adsorber vessel 120 opposite the reversible blower 150, having a pressure reducing influence, depending upon $O_2$ demand. However, adsorber pressure generally increases as the $O_2$ flow through the $O_2$ output is generally not greater than the airflow from the blower 150 into the adsorber vessel 120.

As the adsorption media within the adsorber vessel 120 becomes saturated, it is necessary to allow the adsorption media to recover, and so a recovery reverse mode must be initiated. Initially, the motor 220 enters into a coast (end of feed (EOF)) mode by ceasing driving of the reversible blower 150. The high pressure downstream of the reversible blower and within the adsorber vessel 120 resists further compression caused by the reversible blower 150, so that the reversible blower 150 is immediately caused to be braked because it is rotating in a direction which is opposite the pressure differential across the reversible blower 150. This excess pressure on the adsorber vessel 120 side of the blower 150 eventually causes the reversible blower 150 to come to a stop and to commence rotating in a reverse direction.

Coast step 1 in FIG. 7 depicts that portion of the unpowered coasting process when the reversible blower 150 is still rotating in a forward direction but is slowing down. Coast step 2 defines that portion of the coasting of the reversible blower 150 where the reversible blower has stopped and commenced rotation in a reverse direction under the power associated with the remaining pressurized gas within the adsorber vessel 120.

In the example depicted in FIG. 7, when the gauge pressure within the adsorber vessel 120 reaches approximately 10 psi the motor 220 recommences operation driving the blower 150, but in a reverse direction. It is conceivable that the blower 150 could continue to coast until a pressure differential across the blower 150 is zero, such as when the gauge pressure within the adsorber vessel 120 reaches zero. However, to optimize time efficiency in utilization of the air separation unit system 110, the motor 220 is typically reengaged to drive the blower 150 in the reverse direction before the gauge pressure reaches zero.

The blower 150 continues to be driven in a reverse direction, drawing a vacuum on the adsorber vessel 120 (because valves downstream of the adsorber vessel 120 are closed) until a desired amount of vacuum has been drawn on the adsorber vessel 120 and the adsorption media therein has been sufficiently allowed to recover (by release of $N_2$ and other contaminates therefrom). At an end of this vacuum step the purge tank 160 can be opened and the vessel 120 purged with $O_2$.

At the end of this purge step (as if no purge is provided), the motor 220 can again cease from driving the blower 150 and allow the blower 150 to coast. This coast step 3 (end of purge (EOP)) depicted in FIG. 7 is defined by the blower 150 continuing to rotate in a reverse direction, albeit slowing down toward a stop. Coast step 4 for the blower is further depicted after the blower 150 has come to a full stop and has begun rotating in a forward direction again driven by the pressure differential between the partial vacuum within the adsorber vessel 120 and the higher pressure ambient air at the inlet 130. Final coast step 4 is followed by re-initiation of driving of the blower 150 in a forward direction by the motor 220 to cause the cycle to repeat.

Typical duration times for the various different steps in such a coasting assisted reversing blower adsorption system are depicted in FIG. 8. While in at least some of these coasting steps the driving system 210 can optionally go into a regeneration mode (as labeled and as described above) for power generation. By placing a load on the blower 150, the blower 150 can be caused to be slowed back down to a stop (referred to as regenerative braking) more rapidly than would otherwise be the case. Regenerative power could also be generated after stop and rotational direction change if desired. Thus, such regeneration not only has the benefit of capturing power that would otherwise be lost, but also can cause the overall cycle time to be reduced somewhat.

This disclosure is provided to reveal a preferred embodiment of the invention and a best mode for practicing the invention. Having thus described the invention in this way, it should be apparent that various different modifications can be made to the preferred embodiment without departing from the scope and spirit of this invention disclosure. When structures are identified as a means to perform a function, the identification is intended to include all structures which can perform the function specified. When structures of this invention are identified as being coupled together, such language should be interpreted broadly to include the structures being coupled directly together or coupled together through intervening structures. Such coupling could be permanent or temporary and either in a rigid fashion or in a fashion which allows pivoting, sliding or other relative motion while still providing some form of attachment, unless specifically restricted.

What is claimed is:

1. A method for operation of a reversing blower adsorption based air separation system, including the steps of:
operating a reversing blower inline with an air inlet, an adsorption bed and an $O_2$ output, to separate $O_2$ from air entering at the air inlet;
said operating step including a feed forward step with air driven from the air inlet through the adsorption bed where $N_2$ is adsorbed and on to the $O_2$ output;
said operating step including a recovery reverse step with gas driven from the adsorption bed to the air inlet by reverse operation of the reversing blower for removal of $N_2$ from an adsorption media in the adsorption bed;
said feed forward step and said recovery reverse step driven by gaseous flow through the reversing blower in opposite directions;
the reversing blower coupled to a drive motor which causes the blower to rotate in a forward drive direction and a reverse drive direction;
allowing the blower to coast between at least one period of forward drive and at least one period of reverse drive following the period of forward drive; and
wherein said allowing the blower to coast step includes allowing the blower to coast both as the blower slows down to a stop and continues coasting as the blower begins rotation in a direction opposite blower rotation before coming to a stop.

2. The method of claim 1 wherein said recovery reverse step includes drawing a vacuum on the adsorption bed to remove nitrogen from the adsorption media within the adsorption bed.

3. The method of claim 1 wherein the reversing blower is located between the adsorption bed and the air inlet.

4. The method of claim 1 wherein said allowing step includes allowing the blower to coast between both the period of forward drive followed by the period of reverse drive and between a period of reverse drive followed by a period of forward drive.

5. The method of claim 4 including the further step of drawing power from the blower during at least a portion of said allowing step by placing a load on the blower coupled to an energy storage.

6. The method of claim 5 including the further step of configuring the drive motor as a variable frequency drive to function as an electric generator during at least a portion of said allowing the blower to coast step.

7. The method of claim 6 including the further step of storing in a battery electricity from the motor when functioning as an electric generator.

8. The method of claim 5 wherein a flywheel is removably engagable to the blower through a mechanical power input; and
engaging the mechanical power input to cause energy to be stored in the flywheel from the blower during at least a portion of said allowing step.

9. The method of claim 1 including the further step of drawing power from the blower during at least a portion of said allowing step by placing a load on the blower coupled to an energy storage.

10. The method of claim 1 including the further step of controlling the drive motor to cause the drive motor to switch between driving the blower in a feedforward direction, driving the blower in a recovery reverse direction, and not driving the blower, responsive to control inputs from a controller.

11. A method for operation of a reversing blower adsorption based air separation system, including the steps of:
operating a reversing blower inline with an air inlet, an adsorption bed and an $O_2$ output, to separate $O_2$ from air entering at the air inlet;
said operating step including a feed forward step with air driven from the air inlet through the adsorption bed where $N_2$ is adsorbed and on to the $O_2$ output;
said operating step including a recovery reverse step with gas driven from the adsorption bed to the air inlet by reverse operation of the reversing blower for removal of $N_2$ from an adsorption media in the adsorption bed;
said feed forward step and said recovery reverse step driven by gaseous flow through the reversing blower in opposite directions;
the reversing blower coupled to a drive motor which causes the blower to rotate in a forward drive direction and a reverse drive direction;
allowing the blower to coast between at least one period of forward drive and at least one period of reverse drive following the period of forward drive; and
wherein said allowing step includes using pressure accumulated within the adsorption bed to decelerate the blower at an end of said feed forward step and to accelerate the blower into said recovery reverse step.

12. A method for operation of a reversing blower adsorption based air separation system, including the steps of:
operating a reversing blower inline with an air inlet, an adsorption bed and an $O_2$ output, to separate $O_2$ from air entering at the air inlet;
said operating step including a feed forward step with air driven from the air inlet through the adsorption bed where $N_2$ is adsorbed and on to the $O_2$ output;
said operating step including a recovery reverse step with gas driven from the adsorption bed to the air inlet by reverse operation of the reversing blower for removal of $N_2$ from an adsorption media in the adsorption bed;
said feed forward step and said recovery reverse step driven by gaseous flow through the reversing blower in opposite directions;
the reversing blower coupled to a drive motor which causes the blower to rotate in a forward drive direction and a reverse drive direction;
allowing the blower to coast between at least one period of forward drive and at least one period of reverse drive following the period of forward drive; and
wherein said allowing step includes using vacuum within the adsorption bed to decelerate the blower from driving gas out of the adsorption bed at an end of said recovery reverse step and to accelerate the blower into said feed forward step.

13. A reversing blower adsorption air separation unit, comprising in combination:
a reversing blower downstream from an air inlet, an adsorption bed downstream from said reversing blower, and an oxygen output downstream from said adsorption bed;
the reversing blower coupled to a drive motor which drives the blower in both a forward rotating and a reverse rotating direction, said forward rotating direction driving air from said air inlet through said adsorption bed, and said reverse rotating direction driving gas from said adsorption bed to said air inlet;

a controller coupled to the motor, the controller switching the motor between a forward drive mode, a reverse drive mode and an off mode with said motor not driving said blower either forward or reverse; and wherein a mechanical power input is selectively couple-able to the blower to put a load on the blower and draw mechanical power from the blower to an energy storage.

14. The system of claim 13 wherein said motor is coupled to a battery and operates as a generator driven by said blower to store electric energy within said battery during at least a portion of a period that said motor is in said off mode with said motor not driving said blower.

\* \* \* \* \*